April 3, 1945.  A. STRAUSS ET AL  2,372,862

POWER UNIT FOR FOOD PROCESSORS

Original Filed Jan. 8, 1940  4 Sheets-Sheet 1

Inventors
Alfred Strauss
Eric G. Feltman
Melville M. Hunt
Watson D. Harbaugh
BY
Their Attorney April 3, 1945.　　　A. STRAUSS ET AL　　　2,372,862
POWER UNIT FOR FOOD PROCESSORS
Original Filed Jan. 8, 1940　　　4 Sheets-Sheet 2

Inventors
Alfred Strauss
Eric G. Feltman
Melville M. Hunt
Watson D. Harbaugh
BY
Their Attorney Inventors
Alfred Strauss
Eric G. Feltman
Melville M. Hunt
Watson D. Harbaugh
BY
Their Attorney Patented Apr. 3, 1945

2,372,862

UNITED STATES PATENT OFFICE 2,372,862

POWER UNIT FOR FOOD PROCESSORS

Alfred Strauss and Eric G. Feltman, Chicago, Melville M. Hunt, Park Ridge, and Watson D. Harbaugh, Evanston, Ill., assignors to A. F. Dormeyer Mfg. Co., a corporation of Illinois Original application January 8, 1940, Serial No. 312,874. Divided and this application February 19, 1942, Serial No. 431,588

16 Claims. (Cl. 259—84)

The present invention relates to food processing devices and more particularly to food mixers, liquefiers and juice extractors.

This application is a division of our application, Serial No. 312,874, filed January 8, 1940, for Food processor, reference to which is hereby made for a fuller understanding of the general construction of the food mixer.

It has been the practice to build food processing devices of the class described with the motor casing and the beater and beater drive assembly fashioned as a single unit. Although this has many advantages evidenced almost without exception, by the many mixers upon the market, the advantage of lifting the motor from the standard for mixing food at a point remote from the mixer base, entails the lifting and handling of a heavy article which is very tiresome. In the present invention only the weight of the gear housing is encountered for this purpose. The gear casing can be separated as a unit from the heavy motor parts and constitutes the only part that has to be lifted and handled for remote mixing.

In accomplishing this, we prefer to provide a detachable flexible drive interconnecting the motor and the movable part. By providing the detachable drive, other tools, such as wood carvers, buffers, silver polishers and grinding wheels may be substituted for the beaters upon the beater gear housing or be connected directly to the flexible drive without the housing and other types of food processing units can be driven direct from the motor interchangeably with the housing and the flexible drive. In such instances supports may be provided for the tools or gear housing if they are to be stationary, and, if not, the selected tools may be suitably conformed so that they can be easily handled in operation.

In the present invention, we provide a means for automatically reciprocating the beaters in a bowl from one side of the bowl to the other continuously through any adjusted distance at a slow rate, whereby the bowl will be rotated several turns in one direction and before it has a chance to attain a dangerous speed, move the beaters near the other side for a brief period and cause the bowl to rotate in the opposite direction, in the meantime passing the beaters back and forth over the center of the bowl to remove any collection of unmixed ingredients that generally collect at the center of large bowls outside of the sweep of revolving fixed beaters.

Moreover, very often the motor would not be turned off when the beaters were raised. As a result, the mixture clinging to the beaters would be whirled and splattered over everything nearby. It is the intention of the invention to prevent this happening. In doing this, we stop the motor automatically when the beaters are raised a certain distance and start the motor again automatically when it is lowered past a predetermined level.

Another object of the invention is to provide an improved mounting for a motor wherein vibrations induced by a detachable gear housing are dampened and vibrations induced by the motor are transmitted to a detachable liquefying container to assist in the circulation of solid objects in the container.

Another object of the invention is to provide an improved motor unit interchangeable with different attachments including a motor casing which is cooled in an improved manner without transmitting heat to the attachments and gear housing.

Another object of the invention is to provide an improved arrangement between a motor developing heat in its operation and a gearing unit wherein the heat and lubricant viscosity in the gear housing is practically unaffected by heat developed in the motor.

Another object is to provide an improved speed governor and brush mounting for an electric motor and an improved blower having minimized noise characteristics at high speed for cooling the motor parts.

Another object is to provide an improved motor unit, an improved gear housing, an improved liquefier, and an improved interchangeable relationship between the gear housing, the liquefier and the motor unit.

Another object of the invention is to provide an improved circuit interrupter speed control governor and control therefor which can be used in connection with a food liquefier.

Another object of the invention is to provide an improved drive connection which may be disengaged and engaged at will without any attention to pre-alignment, and with a wide tolerance for out of alignment conditions which might arise due to the manufacture of heterogeneously fitting parts and interchangeability.

Another object is to provide an improved power unit for food processing devices that is provided with self-aligning bearings at both ends of the shaft.

Another object of the invention is to provide a powered food mixer having a low center of gravity and a greater stability against being upset or knocked over.

Another object of the invention is to provide a food processing device which is simple and rugged in its construction, efficient in its purpose and use, inexpensive to manufacture and easily operated and adjusted by persons inexperienced mechanically.

These being among the objects of the present invention, other and further objects will become apparent from the drawings, the description relating thereto and the appended claims.

Referring now to the drawings.

Figure 1:
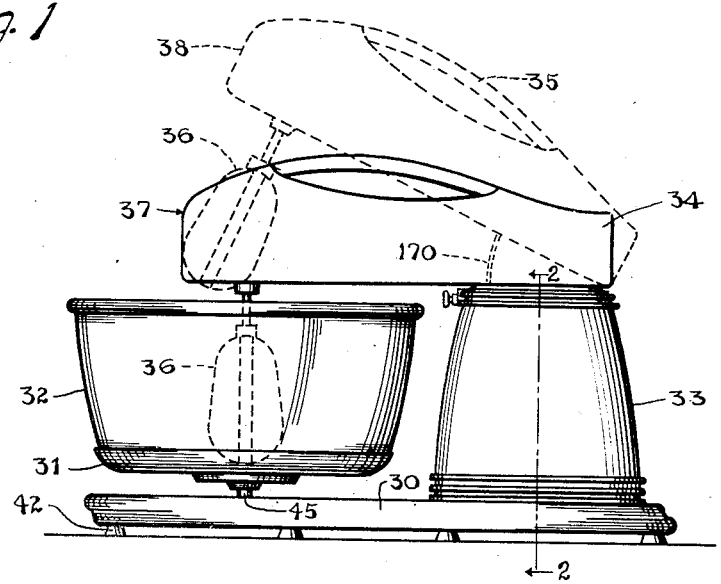
Fig. 1 is a side elevation of an embodiment of the invention illustrating, partly in broken lines, two different positions the beaters may be disposed in when the embodiment illustrated is placed in use.
Figure 7:
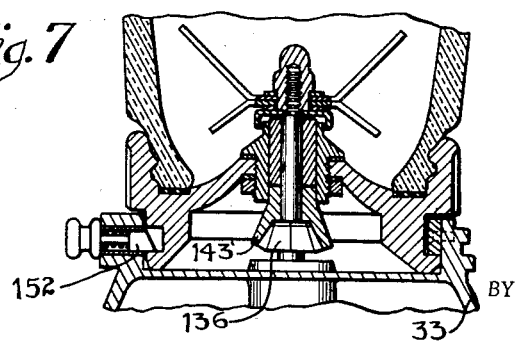
Fig. 7 is a vertical section through a liquefier attachment for the power unit taken upon a vertical plane coinciding with the axis of the power unit.

In the present invention a food mixer is provided in which a base 30 has mounted at one end thereof a turntable 31 supporting a bowl 32 thereon, and, at its other end, an upright power unit 33 supporting at the top thereof a gear housing 34 carrying depending beaters 36 which extend down into the bowl 32 when the gear housing 34 is in its lowered position as indicated by the numeral 37, as distinguished from its raised position as indicated at 38 in broken lines. A handle for managing the gear housing is shown at 35.

Figure 2:
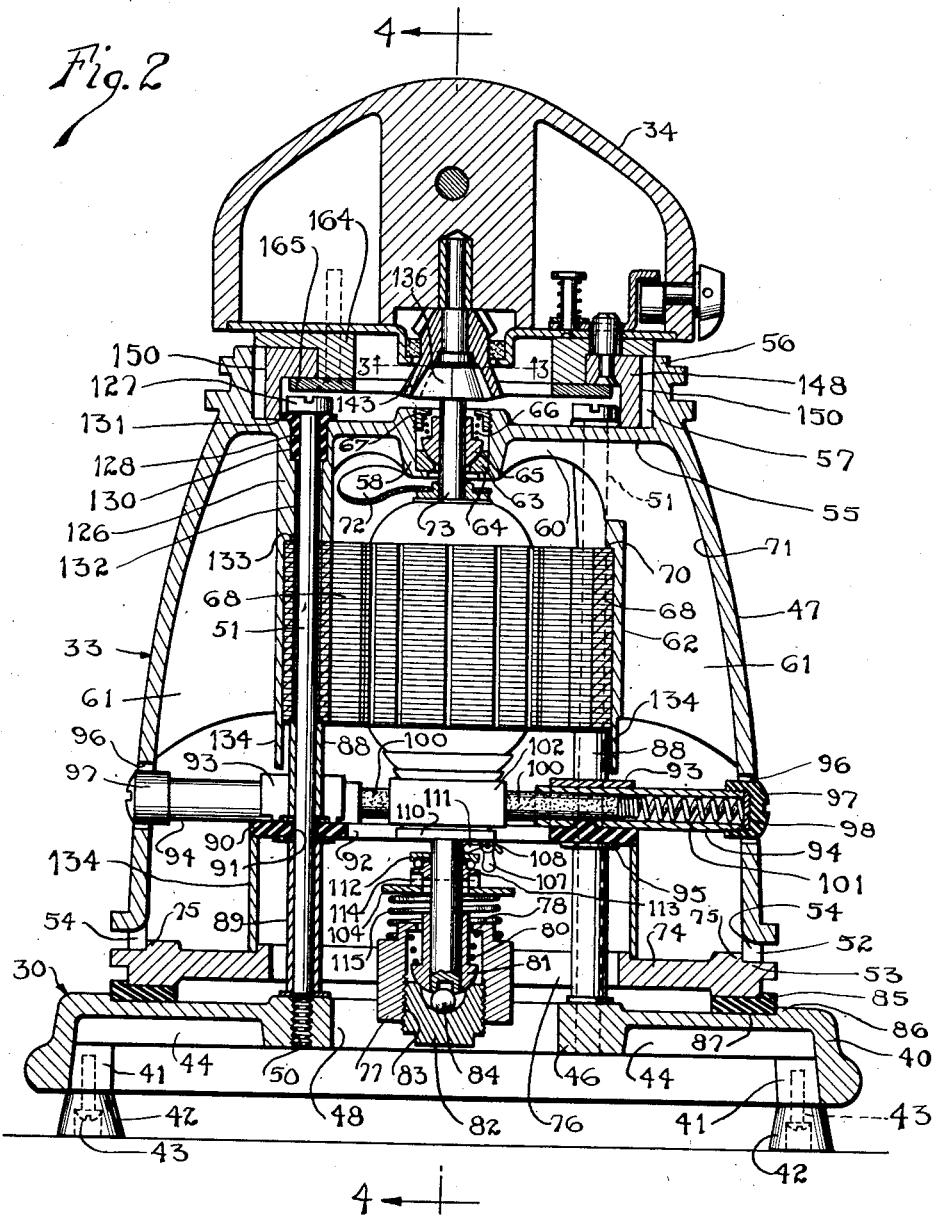
Fig. 2 is a vertical section through the power unit taken upon the line 2—2 in Fig. 1.
Figure 4:
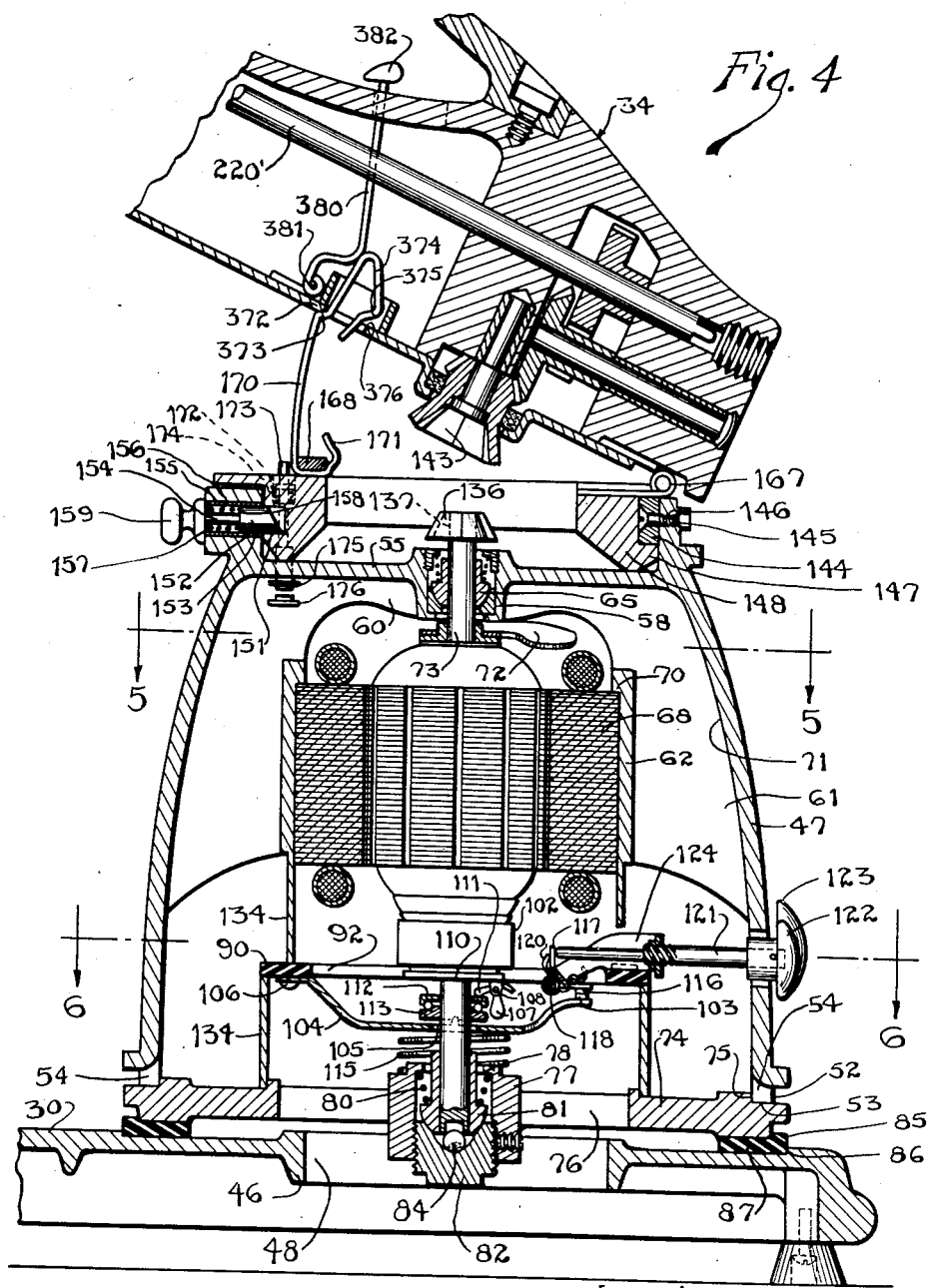
Fig. 4 is a vertical section taken through the power unit and a portion of the gear housing upon a plane running longitudinally with the gear housing as indicated by the line 4—4 in Fig. 2.
Figure 5:
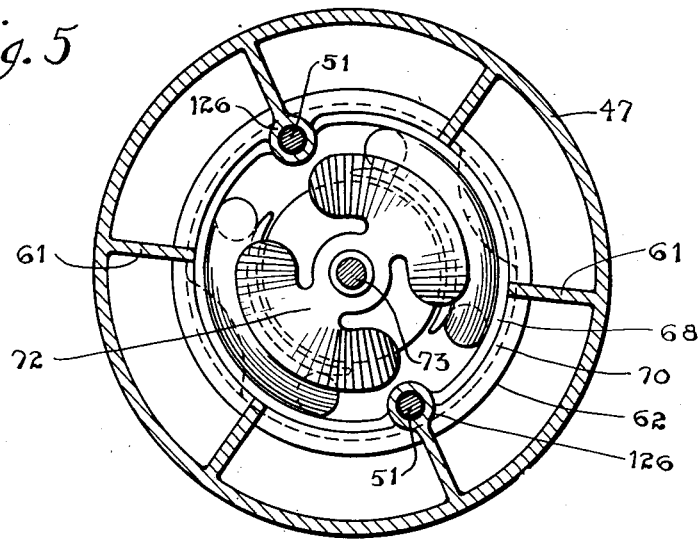
Fig. 5 is a horizontal section through the power unit near the top thereof as taken upon the line 5—5 in Fig. 4.

As best shown in Figs. 2 and 4, the base 30 constitutes a die cast metal unit having downwardly depending flanges 40 with bosses 41 therein to receive rubber feet 42 that are secured thereto by machine screws 43. The base 30 is webbed, as at 44, over the lower face thereof for structural rigidity, and at the front end is provided with a reamed boss (not shown) to journal the spindle 45 of the turntable 31.

At its rear end the base is provided with an integral ring 46, preferably concentric with the housing 47 of the power unit. The ring 46 provides an opening 48 large enough for the free exhaust of air therethrough employed in cooling the motor parts, and also to provide room enough to receive certain parts of the motor assembly for the sake of compactness. Diametrically opposite each other on the ring two drilled and threaded holes 50 are provided to receive the vertical assembly bolts 51 which hold the elements of the power unit together as an assembly and also secure the unit to the base. The power unit 33 comprises a die-cast part having a shell 47 of a curvilinear, upwardly tapering contour which is open at the lower end, where the marginal edge 52 is staggered to provide openings 54 when the lower edge 53 is lowered against a member having a flat face.

The upper ends of the shell 47 are closed by an integral horizontal wall 55, spaced from the upper edge 56 a slight distance to provide an upwardly opening cylindrical cavity 57.

At its center the wall 55 is provided with a boss 58 structurally reinforced by radial webbing 60 which extend to the sides of the shell 47 and downwardly as ribs or fins 61 integrally therein as a part of the inner edges of the fins 60.

The boss 58 is bored to receive, in supported relationship, a self aligning bearing comprising a washer 63 resting upon a shoulder 64 at the bottom of the boss and a bearing member 65 held in universal engagement with the washer 63 by a spring 66 placed under tension by a collar 67 threaded into the upper end of the boss 58.

An annulus 62 is cast integrally with the inner edges of the fins 61 and the annulus 62 is reamed to receive the stator 68 of the motor as limited by a shoulder 70 left in the reaming operation near the upper end of the annulus 62 at a place to locate the stator a predetermined distance from the end wall 55.

It will be seen from the description thus far that the stator 68 when fit into the ring 62 is brought into heat transfer contact therewith whereby heat developing in the stator is conducted directly to the reinforcing fins 61 and ribs 60. The inner contour 71 of the shell 47 is formed to provide a streamlined passageway for air flowing in through the opening 54 and upwardly over the fins 61 to the top of the shell. From there the air passes radially inwardly with full freedom of movement over the upper end of the ring 62 where it is driven by the fan 72 mounted upon the armature shaft 73, downwardly and centrally through the stator 68 and outwardly to the outside again through the openings 48. At no time is the air stream in a position to contaminate food in the bowl and the air is in contact with the outside of the heated parts as well as passing through them.

At its lower end 52 the shell 47 is supported upon an intermediate member 74 comprising a plate circumferentially shouldered at 75 to receive end portions 53 of the shell 47. At its peripheral edge the plate is made solid to form part of the passageway of the cold air while at its center it is webbed, as at 76, to permit the downwardly passing air access to the opening 48. The webbing at 76 is made of radial portions providing a spider supporting a bearing boss 77 at the center thereof somewhat similar in construction to the boss 58 at the top.

The bearing boss 77 is reamed out from the bottom to leave a shoulder 78 at the top thereof which receives a compression spring 80 which holds bearing 81 in universal engagement with a plug 82 threaded as at 83 into the bearing boss 77.

In addition to supporting the bearing 81 the plug 82 supports, in adjustable relation, a ball end-thrust bearing 84 for the shaft 73.

The intermediate member 74 is in turn supported upon a shouldered washer 85 made of live rubber, which dampens the transmittance of all sound and vibration to the base 30 from the intermediate members 74 including the shell 47.

The washer 85 is prevented from slipping sidewise by a shoulder 86 formed as a part of a recess 87 into which the washer is pressed upon the upper surface of the base 30.

It has already been mentioned that the bolts 51 secure the shell 47 to the base 30. It is upon these bolts that the remaining motor parts, other than the armature, are supported as a unit and held in spaced relation by sleeves 88 and 89.

This unit comprises an improved brush governor unit made up of a pressed plate 90 composed of electrical insulating material which is apertured as at 91 to receive the bolts 51 and upon which the other parts are mounted.

Figure 6:
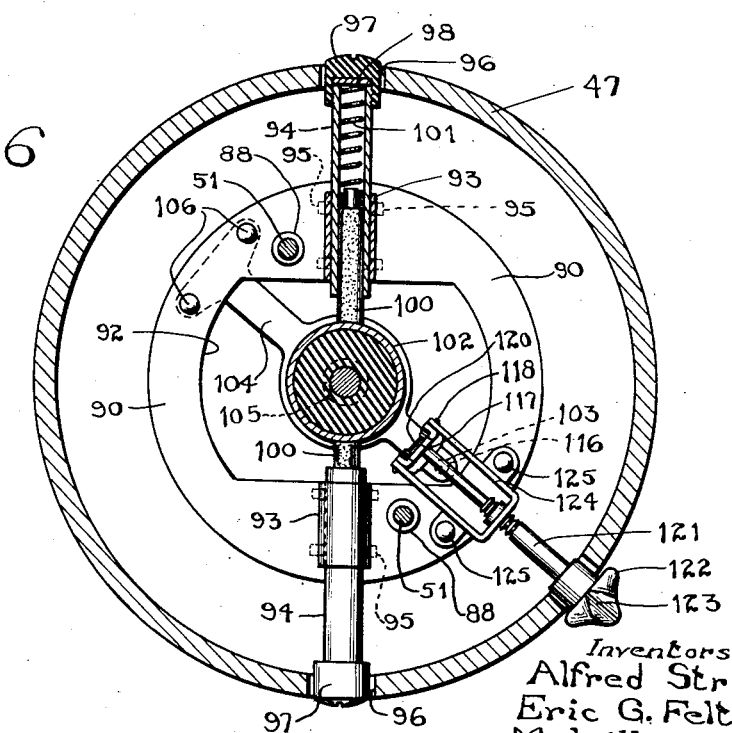
Fig. 6 is a horizontal section through the power unit as taken upon the line 6—6 in Fig. 4.

As more particularly shown in Fig. 6 the plate 90 is circular with a large central aperture 92 to permit free circulation of air therethrough. Upon the upper side of the plate 90 at diametrically opposed points, U-shaped brackets 93 secure brush holders 94 in place by fingers 95 extending through the plate where bent over portions upon the lower side thereof clinch the brackets and holders in place. The brush holders 94 are tubular, being preferably made of brass with an irregular outer contour preventing their turning when held by the brackets 93. The tubes 94 extend to the wall of the shell 47 where apertures 96 are provided to receive kurfed Bakelite caps 97. The caps 97 removably support brass disks 98 at the outer ends of the tubes where the disks provide an electrical contact between the tube 94 and the compression springs 101 which contact and hold the brushes 100 against the commutator 102. Electrical connections in the motor circuit are made through leads running to the brackets 93. This construction provides for a ready assembly and removal for the installation and repair of the brushes.

Upon the lower side of the plate 90 the parts of the circuit breaking centrifugal governor are mounted. The movable contact 103 thereof (see Fig. 4) is mounted upon a spring bar 104, which is apertured as at 105 to encompass the shaft 73 and is secured to the plate 90 as by riveting 106.

The contact bar 104 is moved back and forth in response to variations in the motor speed by centrifugal weights 107 pivotally mounted at 108 upon a plate 110 press fitted or secured against the commutator 102. The centrifugal weights 107 are all shaped with a bell crank end portion 111 pressing against an axially movable disk 112 having a ball bearing engagement with a follower 113 keyed against rotation by fingers 114 upon the contact bar 104. The train of elements just described are collapsed against the exercise of the centrifugal force mentioned by means of a compression spring 115 between the bar 104 and the bearing boss 77.

Beneath the contact 103 and cooperating therewith is a manually movable contact 116. The contact 116 is mounted upon a bell-crank 117 by a pivot pin 118, carrying a torsion spring 120 urging the contact 116 toward the contact 103. The limit of movement permitted the contact 116, and its adjustment is accomplished by means of a coarsely threaded shaft 121 extending through the wall of the shell 47, where it receives a handle 122 with an indicator 123 thereon. The shaft 121 and the pivot pin 118 are supported in a single metal stamping 124, riveted, as at 125, to the upper face of the plate 90.

The brush governor assembly thus described is neat and compact, the unit is readily assembled outside of the motor housing, and easily placed in the motor housing between the sleeves 88 before the bolts 51 are inserted in place, one cap 79 being inserted through one opening 96 before the other cap is raised to position, it being optional whether the brushes are assembled before or afterward.

In assembling the motor unit the casing or shell 47 is turned bottom side up after the self-aligning bearing 65 is assembled and secured in place. The bolts 51 are then inserted upwardly through cylindrical bosses 126 integral with the end wall 55. Adjacent the heads 127 of the bolts cylindrical rubber sleeves 128 are provided to fit in an enlarged recess 130 in the bosses 126. The sleeves are flanged radially, as at 131, to provide a vibration dampening washer-like member fitting snugly between the head 127 of the bolt and the upper face of the end wall 55. The opening 132 in the boss 126 below the washer 128 is widened to receive the bolt with a wide clearance so as to prevent metal to metal contact at this point.

The stator 68 is then inserted in place and comes to rest against the ends 133 of the bosses 126 and the shoulder 70. The armature 73 is then lowered into place with the upper end lowered through the self aligning bearing 65.

The upper sleeves 88 are slipped in place to act as spacers for the brush-governor unit, and after the governor unit is located in place, the lower sleeves 88 are slipped over the ends of the bolts 51, air flow control sleeves 134 being located upon opposite sides of the unit to prevent recirculation of cooling air inside the shell 47.

Thereafter the spider 74 is disposed in place; the vibration dampening washer 85 assembled therewith, and the base 30 inserted to mate with the rubber washer 85 where it receives, in threaded relation, the threaded ends of the bolts 51.

After the bolts 51 have been tightened the motor unit and base are turned right side up to receive preferably the male member 136 of a quadrate universal joint.

Figure 3:
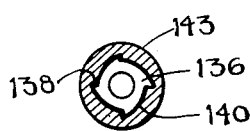
Fig. 3 is a horizontal section through the universal coupling between the gear housing and the motor unit as taken upon the line 3—3 in Fig. 2.

The member 136 drives a female member 143 carried by the gear casing 34 which mates with the member 136 with adequate radial clearances 140 to allow for misalignment of the supporting shafts normally expected to occur in the manufacturing tolerances of the two parts (Fig. 3). The radial faces 138 upon the teeth of the male member face in the direction of rotation and the radial faces 192 upon the female member face in the opposite direction to be driven by the first.

Although any number of faces may be provided, it is preferable to have four disposed at right angles to each other. In this way the universal action developed by an Oldham coupling is made available in a new and novel manner in food mixers. The faces mating between the members at all times permit free slippage radially without a binding that would interfere with the free movement required. Moreover the contour of the teeth as provided is such that the male and female members may be separated and brought together with minimum interference in making the drive joint. The taper of the bevel is so designed in relation to the radial dimensions of the face that they permit arcuate engagement and disengagement with immediate mating without interference between the members as they are moved relative to each other.

The cavity 57 in the top of the motor housing 47 is provided with a block 144 disposed at the rear thereof flush with the top 56 where it is held in place by screws 145 threaded into the wall of the cavity at 146. This block provides an anchorage for an outwardly extending lip 147 provided upon a collar 148. The radial contour of this element is flattened at the sides 150 to permit inclined downward and rearward insertions of the lip 147 under the block 144 with minimum tilt.

At its front side the collar 148 is drilled out as at 151 where it receives a snap latch 152 reciprocally mounted in a radial bore 153 disposed in the front of the wall of the cavity 57. The latch comprises a reduced intermediate portion 154 over which an inwardly flanged sleeve 155 is slipped with an expansion spring 156 acting between a flange 157 upon the sleeve and a shoulder 158 upon the latch to force the latch inwardly.

The latch is controlled by a handle 159 swagged upon the outer end thereof after the sleeve and spring are assembled. The sleeve fits tightly in the bore and thereby holds the latch in latching position when once assembled in place. In this way the collar is locked in place in the cavity 57.

The inside contour of the collar 148 comprises an inwardly extending flange 160 providing upper and lower bearing surfaces 161 and 162 respectively grooved as at 163 to receive lubricant.

These bearing surfaces support, against axial displacement and tilting, a head 164 following the contour of the upper surface 161 and inner surface of the flange 160 with a retaining ring 165 resting against the lower face 162 where it is held against the head 164 by means of screws 166.

Thus, whenever the collar is inserted into and secured in the cavity as by the latch 152, the head is rotatable with respect to the motor unit.

Without describing the gear housing in detail it may be well at this time to point out that the head 148 is provided with an arcuate slot 172 which receives a pin 173. The pin 173 is reciprocally mounted in the collar and urged by a spring 174 to an upper limit where the pin extends above the head. When the gear housing is lowered against the upper end of the pin, the pin is driven downwardly. The lower end of the pin controls a normally open switch whose one pole 175 assists the spring 174 in urging the pin upwardly. The switch 176 is connected in the motor circuit to stop the motor whenever the switch is open.

With this construction, whenever the gear housing is raised, such as when it becomes desirable to remove the beaters from the bowl, the motor is stopped, preferably before the universal joint 136 is broken. This prevents motors, such as the series wound motor, preferably used in the embodiment, from running without a load and stops the beaters. When the beaters are lowered again the universal joint is engaged before the switch is closed. Thus, the motor never runs without some load, and, as a further advantage, the make and break switch prevents the food mixture, clinging to the beaters, from being thrown out over the edge of the bowl as the beaters leave the level of the liquid in the bowl when the beater housing is raised. This obviates dangers conventionally experienced with mixers which are not shut off when the housewife tilts the beaters to remove them from the bowl.

Whenever it is desirable to attach the transmission to the motor, the shoulder 147 is inserted under the lug 144 and the front end lowered in place to dispose the beaters either in the center or at the side of the bowl. If the latch does not snap home immediately a slight oscillation of the transmission will cause the latch to seek the opening nearest to it, after which the transmission will be held rigidly in that position.

To raise and lower the beaters of this embodiment with respect to the bowl a spring support 170 is secured to the collar by eyelet 168. The spring 170 is preferably formed with an arc of a greater radius than the distance between the lower part thereof and the pintle of the hinge 167. At a predetermined point, a shoulder 372 is provided on the spring 170 to engage with the shoulder 373 upon the base plate to hold (see Fig. 1) the gear housing in raised position with the beaters as shown at 36 when the housing has been pivoted upwardly above the hinge 167. A reverse bend 374 at the upper end of the spring has a downwardly facing shoulder 375 thereon which engages with the shoulder 376 upon the base plate to prevent too wide a pivotal movement of the transmission.

Release of the spring 170 is had by a lever 380 pivoted as at 381 and provided with a handle 382 arranged so that when the handle is moved rearwardly the shoulder 372 is forced from contact with the shoulder 373.

Although certain preferred embodiments of the invention have been shown and described herein, it will be apparent to those skilled in the art that various uses, modifications and changes may be made therein without departing from the spirit and substance of the invention, the scope of which is commensurate with the appended claims.

What is claimed is:

1. In a mixing device, a motor and housing, an agitator supporting member engaging the housing a drive shaft journalled in said member, manually controlled governor means for regulating the speed of the motor, engaging means having radially disposed engaging faces by which the motor engages and disengages the drive shaft, and means for stopping the motor independently of the said governor means when the drive shaft and said supporting members are raised a predetermined height, and releasable means for holding said engaging means in operation and the stopping means out of operation at will.

2. In a mixing device having a container and means for supporting a driven means removably in the container, a power unit comprising a housing and an armature shaft exposed at one end of the housing, manually controlled governor means for regulating the speed of the motor, means by which the armature shaft engages and disengages the driven means in driving relationship, and means for stopping the motor independently of said governor means when the drive between the power unit and driven means is disengaged, and releasable means for locking said engaging means in operation and holding the stopping means out of operation at will.

3. In combination a motor casing, a motor with a vertically disposed shaft, a self-aligning bearing supported in the upper part of the casing and supporting the upper end of the shaft, a self-aligning bearing supporting the bottom of the shaft, a speed governor operated from the shaft, a gear housing mounted upon the casing, a disengageable universal joint between the shaft and the housing, and means for adjusting the shaft axially to normalize the governor and provide adequate clearance at the universal joint to allow for misalignment under manufacturing tolerances between the shafts connected by the joint.

4. An electrical motor comprising a housing closed at one end and having a central jacket for housing the motor shaft and associated parts, the walls of the housing extending laterally to provide an auxiliary chamber outside of the central jacket except at said one end for providing a passageway for air through said central jacket and auxiliary chamber, and structural fin means connecting the jacket with the walls to provide supporting means for the jacket and cooling elements disposed in the path of said air, the intake and outlet for said passage being located at the same ends of the housing.

5. An electrical motor comprising a housing closed at one end and having a central chamber for housing the motor shaft and associated parts, the walls of the housing extending laterally to provide an auxiliary chamber separated from the central chamber except at said one end of the housing for providing a passageway for air through said central and auxiliary chambers, and means driven by the motor for propelling air through said passageway.

6. In a mixing device having a container and a driven means carried in the container, a power unit for driving said means comprising an armature, a housing journalling one end of the armature, a support engageable on the housing for journalling the driven means in driven relationship with the armature shaft, a manually controlled governor means for varying the speed of the power unit, a switch controlled automatically when the power unit and the driven means are connected for starting and stopping the power unit without varying the setting of the governor, and manually actuated means for securing the driven means in place and the switch closed.

7. In a mixing device having a driven shaft and support for the shaft, an electric motor for driving the shaft comprising a housing pivotally mounting the support to place the shaft in driven relationship with respect to the motor, a manually controlled means for varying the speed of the motor including a centrifugal governor, a switch in circuit with the motor and controlled automatically by the weight of the support when the drive between the motor and the shaft is effected for starting and stopping the motor without varying the setting of the manually controlled means and the speed at which the governor is effective to control the speed, and manually actuated means for securing the support in place to hold the shaft in place with the switch closed.

8. A power unit for a food mixer comprising a housing open at one end, a bearing support at the other end of the housing, a cylindrical wall adjacent said bearing support spaced from the housing and secured to the housing by integral fins providing longitudinal passageways between the housing and wall, said cylindrical wall providing a compartment centrally of the housing, means for connecting the passageways at one end to said compartment, a stator mounted in the compartment, an armature journalled at one end in the bearing and having a fan for moving cooling air through said passageways, a spider secured to the housing at the open end and journalling the other end of the armature, a brush carrier, means for supporting the spider, housing and carrier in spaced relation including elongated elements receiving spacer sleeves thereon, and air deflecting means separating the air flowing through said passageways from air flowing through said compartment at said open ends of the housing.

9. A power unit for food mixers having a support, said power unit comprising a stator for an electric motor, an armature disposed in said stator, means for journalling one end of the armature, means at the other end for journalling the other end of the armature, means disposed in spaced relation to each other for supporting the stator upon the support and in spaced relation with respect to said journalling means including bolts extending through the stator and spacer sleeves between the stator and support, a unitary brush holder held in place by said supporting means, and means for circulating air over the outside and inside of said stator for cooling same.

10. A power unit for food mixers comprising a stator, an armature disposed in said stator, members for journalling the armature at both ends, means for securing the members, and stator in spaced relation including sleeves and bolts extending through the sleeves and stator, a unitary brush holder mounted upon the bolts and held in place by the sleeves, centrifugally responsive governor means upon the armature, and means carried by said holder to cooperate with said governor means including a manually controlled member.

11. A combined governor and brush unit for a motor comprising a mounting plate, brush holders mounted upon one side thereof, an arm mounted upon the other side of the plate and adapted to be moved in relation to the speed of the motor, a second arm mounted upon the plate and adapted to be moved manually, and insulated contacts carried by said arms.

12. In a device of the class described, a motor casing having a vertically disposed shaft, a self aligning bearing supported in the upper part of the casing and journalling the upper end of the shaft, a speed governor operated from the shaft, means on the upper end of the casing for interchangeably supporting housings each one of which journals a driven shaft, a disengageable universal joint capable of being established between the vertical shaft and the shaft journalled by the housing supported on the casing, and means for journalling the lower end of the vertical shaft including an adjusting element to normalize the governor and provide adequate clearances at the universal joint to allow for misalignment under manufacturing tolerances between the shafts connected by the joint.

13. In a device of the class described, a casing, a motor drive shaft journalled in said casing, said shaft being exposed at one end of the casing, a speed governor operated from the shaft, means upon the casing where the shaft is exposed for supporting any one of a plurality of housings interchangeably, a driven shaft journalled in each housing, an element upon the drive shaft, an element upon each of the driven shafts capable of mating with the element upon the drive shaft to provide a disengageable universal joint, and means for normalizing the governor including an end thrust adjustment which provides adequate clearance at the make up of the universal joint to allow for misalignment under manufacturing tolerances between the shafts connected by the joint.

14. In a device of the class described, a casing, a series wound fractional horsepower motor in said casing having one end of the armature shaft exposed at one end of the casing, a centrifugally actuated speed governor driven from the shaft including a circuit interrupter switch in the motor circuit, means upon the casing where the shaft is exposed for supporting interchangeably in weight bearing relationship any one of a plurality of housings having a driven shaft journalled therein, elements on said armature shaft and driven shaft engaging each other to provide a disengageable universal joint when said housing is located upon the casing, means for normalizing the governor including an element adjusting the position of the armature to provide adequate operative clearances between the co-operating elements, and means controlled by said housing for stopping the motor automatically when said elements are disengaged.

15. A food mixer comprising a base, a motor casing at one end of the base, a transmission housing overhanging the base and having a driven shaft journalled therein, an armature shaft journalled in said motor casing at the end proximate to the transmission, means for pivotally mounting the transmission housing with respect to the base to dispose said shafts substantially in alignment, an interengaging driving means between said driven shaft and drive shaft including male and female elements detachably engaging one another, and means for causing rotation of said armature when the male and female elements engage.

16. In a food mixer having an elongated base, a power unit located directly upon the base at one end thereof including a motor housing adapted to support a driven device, a motor in the housing having a vertically disposed armature shaft journalled in the housing and exposed at the upper end, a centrifugal speed governor operated by the shaft, means upon the armature shaft for driving said driven device in releasable drive relationship, means for adjusting the governor to regulate the speed of the armature shaft including a handle located upon the side of the housing for regulating the setting of the governor and manual switch means for controlling the motor.

ALFRED STRAUSS.
ERIC G. FELTMAN.
MELVILLE M. HUNT.
WATSON D. HARBAUGH.